United States Patent [19]
Bridges et al.

[11] Patent Number: 5,784,708
[45] Date of Patent: Jul. 21, 1998

[54] TRANSLATION MECHANISM FOR INPUT/OUTPUT ADDRESSES

[75] Inventors: K. Monroe Bridges, Fremont; Robert Brooks, Roseville; William R. Bryg, Saratoga; Stephen G. Burger, Santa Clara, all of Calif.; Michael L. Ziegler, Whitinsville, Mass.

[73] Assignee: Hewlett-Packard Company, Palo Alto, Calif.

[21] Appl. No.: 647,074

[22] Filed: May 8, 1996

Related U.S. Application Data

[63] Continuation of Ser. No. 217,536, Mar. 24, 1994, abandoned.

[51] Int. Cl.$^6$ ............................................. G06F 12/10
[52] U.S. Cl. ................................................... 711/207
[58] Field of Search ................................. 395/413, 416, 395/417, 418; 711/206, 207

[56] References Cited

U.S. PATENT DOCUMENTS

| | | | |
|---|---|---|---|
| 4,155,119 | 5/1979 | De Ward et al. | 711/206 |
| 4,403,282 | 9/1983 | Holberger et al. | 395/842 |
| 4,669,043 | 5/1987 | Kaplinsky | 822/3 |
| 5,263,140 | 11/1993 | Riordan | 711/207 |
| 5,301,287 | 4/1994 | Herrell et al. | 711/202 |
| 5,347,636 | 9/1994 | Ooi et al. | 711/203 |
| 5,426,750 | 6/1995 | Becker et al. | 711/207 |

OTHER PUBLICATIONS

David A. Patterson, John L. Hennessy, *Computer Architecture A Quantitative Approach*, Morgan Kauffman Publishers, Inc., San Mateo, California, 1990, pp. 466–474.

Series 10000 Technical Reference Library Vol. 6—Core System Buses and Controllers, Order No. 011725-A00, Apollo Computer, Inc. Chelmsford, MA, 2-1 through 2-16, 3-22 through 3-28.

Patent Abstracts of Japan, vol. 10, No. 298 (P-505), Oct. 9, 1986 and JP-A-61 114352 (Fujitsu Ltd.), Jun. 2, 1986.

IBM Technical Disclosure Bulletin, vol. 19 No. 1, Jun. 1976, New York, U.S., pp. 83–84, XP002001783; Anonymous: "Minimizing Input/Output Page Pinning In A Virtual Storage Data Processor. Jun. 1976".

EP-A- 0 508 577 (IBM), Oct. 14, 1992; Abstract, Col. 4, line 54-Col. 5, line 51; figure 3.

*Primary Examiner*—Jack A. Lane

[57] ABSTRACT

A computing system includes a memory bus, an input/output bus, a main memory, and an input/output adapter. The memory bus provides information transfer. The input/output bus also provides information transfer. For example the input/output bus is an input/output bus onto which is connected input/output devices. The main memory is connected to the memory bus. The main memory includes a page directory. The page directory stores translations. Each translation in the page directory includes a portion of an address for data transferred over the input/output bus, for example, the page address portion of I/O bus address. Each translation in the page directory also is indexed by a portion of an address for a memory location within the main memory, for example, the page address portion of the address for the memory location. The input/output adapter is connected to the memory bus and the input/output bus. The input/output adapter includes an input/output translation look-aside buffer. The input/output translation look-aside buffer includes a portion of the translations stored in the page directory.

11 Claims, 5 Drawing Sheets

TRANSLATION MECHANISM FOR INPUT/OUTPUT ADDRESSES

CROSS REFERENCE TO RELATED APPLICATION

This application is a continuation of application Ser. No. 08/217,536, filed Mar. 24, 1994, now abandoned.

BACKGROUND

The present invention concerns translations of input/output (I/O) addresses by an input/output adapter.

Address translation maps are often used to convert I/O bus addresses to memory addresses. Such address translation maps have been used when the I/O bus address range is smaller than the memory address range, so that I/O accesses can reference any part of memory.

In the prior art, I/O address translation maps have been managed by software. Each entry in the address translation map is explicitly allocated and loaded by operating system software. The number of entries in the address translation map is a limited resource. Therefore operating system software which managed the address translation map has to carefully manage the address translation map to best utilize this limited resource. Additionally the operating system was required to be able to handle cases when requests for usage of the address translation map overflowed the available address translation map resources.

Typically, in order to best manage the address translation map, I/O map fault interrupts are needed to load needed entries into the address translation table. The I/O map fault interrupts are needed when an entry cannot be loaded at the time a direct memory access (DMA) transaction is started.

Because of the above-discussed considerations, operating system software to support an address translation map within an I/O adapter is generally complex. In addition, the use of I/O map fault interrupts to load needed entries into the address translation table increase software overhead, thus reducing overall system performance.

SUMMARY OF THE INVENTION

In accordance with the preferred embodiment of the present invention, a computing system includes a first interconnect means, a second interconnect means, a main memory, and an input/output adapter. The first interconnect means provides information transfer. For example, the first interconnect means is a memory bus. The second interconnect means also provides information transfer. For example, the second interconnect means is an input/output bus onto which is connected input/output devices.

The main memory is connected to the first interconnect means. The main memory includes a page directory. The page directory stores translations. Each translation in the page directory is indexed by a portion of an address for data transferred over the second interconnect means, for example, the page address portion of an input/output bus address. Each translation in the page directory includes a portion of an address for a memory location within the main memory, for example, the page address portion of the address for the memory location.

The input/output adapter is connected to the first interconnect means and the second interconnect means. The input/output adapter includes a input/output translation look-aside buffer. The input/output translation look-aside buffer includes a portion of the translations stored in the page directory.

To access the input/output translation look-aside buffer, the most significant bits (called the chain identifier) of a first address of data transferred over the second interconnect means is used to obtain a first translation from the input/output translation look-aside buffer. The first translation is checked to determine whether the first translation contains an entry for the first address. This is done, for example, by comparing a tag portion of the first translation with a corresponding portion of the first address to determine whether there is a match.

In one preferred embodiment of the present invention, at start up, an address size for data transferred over the second interconnect means is configured. This is done, for example by placing a value which identifies a relative position of the chain identifier into a mask register. When accessing data, the chain identifier is extracted in order to access the first translation from the input/output translation look-aside buffer. This extraction is done by a plurality of logic gates which utilizes the value in the mask register.

The preferred embodiment of the present invention provides a scheme for effective translation of address within an input/output adapter. The main storage for the page directory is in the main memory for the computing system. Generally memory space within main memory is a relatively inexpensive resource. Also, the hardware implementation of the input/output translation look aside buffer within the input/output adapter is relatively inexpensive.

DESCRIPTION OF THE PREFERRED EMBODIMENT

Figure 1:
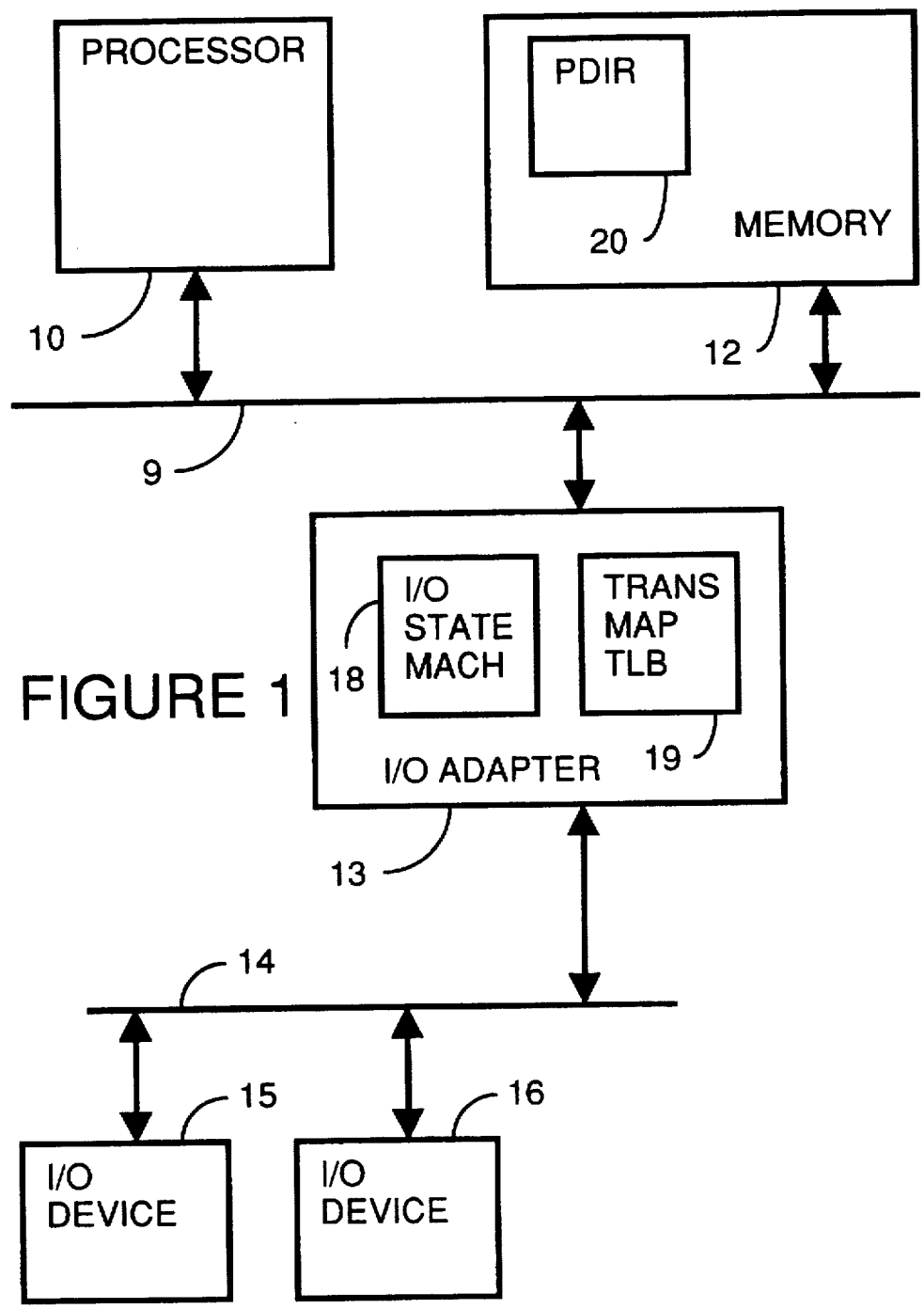
FIG. 1 shows a simplified block diagram of a computer system with an input/output (I/O) adapter in accordance with a preferred embodiment of the present invention.

FIG. 1 shows a simplified block diagram of a computer system. A processor 10 and a memory 12 are shown connected to a memory bus 9. Also connected to memory bus 9 is an input/output (I/O) adapter 13. I/O adapter 13 is connected to an I/O bus 14. Also connected to I/O bus 14 are an I/O device 15 and an I/O device 16. A input/output translation look-aside buffer (TLB) 19 is used to convert addresses used for I/O bus 14 to addresses used by memory 12. A full I/O translation page directory (PDIR) 20 is stored in memory 12. An I/O state machine 18 within I/O adapter 13 provides hardware control of I/O TLB misses from transactions on I/O bus 14.

Figure 2:
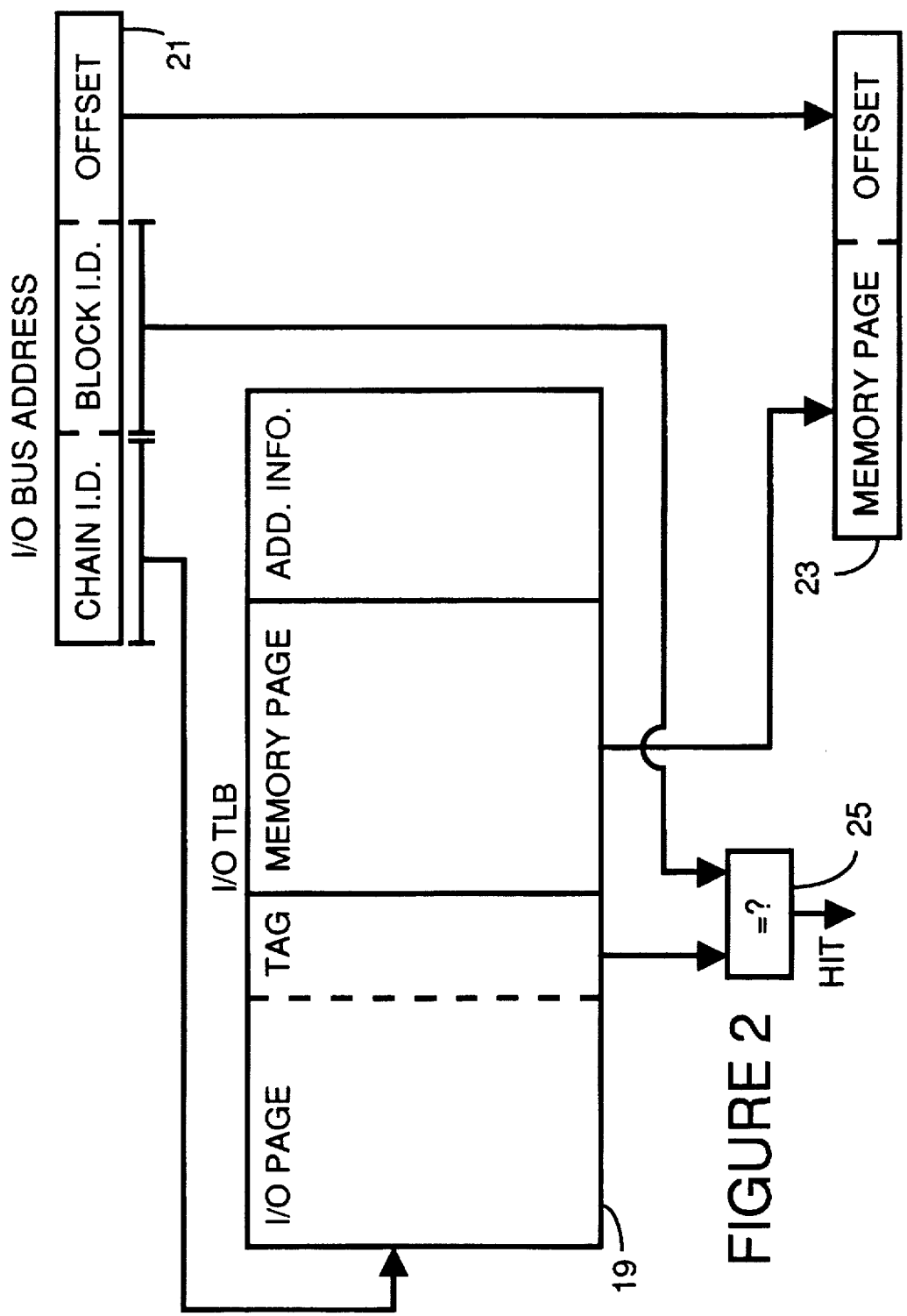
FIG. 2 shows an implementation of an input/output (I/O) translation look aside buffer (TLB) within the I/O adapter shown in FIG. 1, in accordance with a preferred embodiment of the present invention.

FIG. 2 shows an implementation of I/O TLB 19 in accordance with the preferred embodiment of the present invention. I/O TLB 19 is used to translate an I/O bus address 21 to a memory address 23. I/O TLB 19 is implemented as a direct mapped cache of I/O translations. Alternately, I/O TLB 19 could be implemented as a fully associative cache or a set associative cache. However, the method of assigning addresses based on a chain ID and block ID allows a direct mapped cache to work equally as efficiently as an associative cache while being simpler and cheaper. Operating system software assigns differing chain IDs to each concurrent DMA to allow the direct mapped cache to work efficiently.

In the preferred embodiment, the page address portion of I/O bus address 21 consist of a chain identification portion and a block identification portion. During a translation, I/O bus address 21 is used to access a corresponding memory page address within I/O TLB 19. In the embodiment shown in FIG. 2, the chain identification portion is used as an index into I/O TLB 19. Comparator 25 compares the block identification portion of I/O bus address 21 with the tag portion from the translation entry accessed by the chain identification portion of I/O bus address 21 to determine whether the currently sought translation is within I/O TLB 19. The I/O address offset is the same as the memory address offset.

For example, in the preferred embodiment, I/O bus 14 utilizes thirty-two bit addresses, each address having a twenty bit I/O page number and a twelve bit offset. The chain identification is the leftmost eight bits of the twenty bit I/O page number. The block identification is the rightmost twelve bits of the twenty bit I/O page number. Memory bus 14 utilizes forty bit addresses, each address having a twenty-eight bit memory page number and a twelve bit offset. In this system, no hashing or linked lists are necessary.

In the preferred embodiment, for each translation entry, I/O TLB 19 also may include additional information, such as a coherence index, data access attributes and a valid bit indicating whether the translation entry is valid.

On each memory access from I/O bus 14, I/O adapter 13 uses the chain identification from the I/O bus address to access a translation entry within I/O TLB 19. If the tag for the accessed translation entry from I/O TLB 19 matches the block identification from the I/O bus address, I/O adapter 13 uses the translated address and the additional information stored in I/O TLB 19 for the entry, to complete the memory access. If the tag does not match, I/O adapter 13 accesses the appropriate translation entry from I/O PDIR 20. I/O adapter 13 places the translation entry from I/O PDIR 20 into I/O TLB 19 and performs the original access.

A translation entry may be accessed from I/O PDIR 20 using the page address portion of the I/O bus address. In order to determine the location of a translation entry within memory 12, the page address portion of the I/O bus address for the translation entry is multiplied by the number of memory locations utilized by each translation entry within I/O PDIR 20. The resulting number is added to the base address for I/O PDIR 20 within memory 12. The base address is initialized by software in a register in I/O adapter 13. The resulting memory address is used to access the translation entry within I/O PDIR 20.

Figure 3:
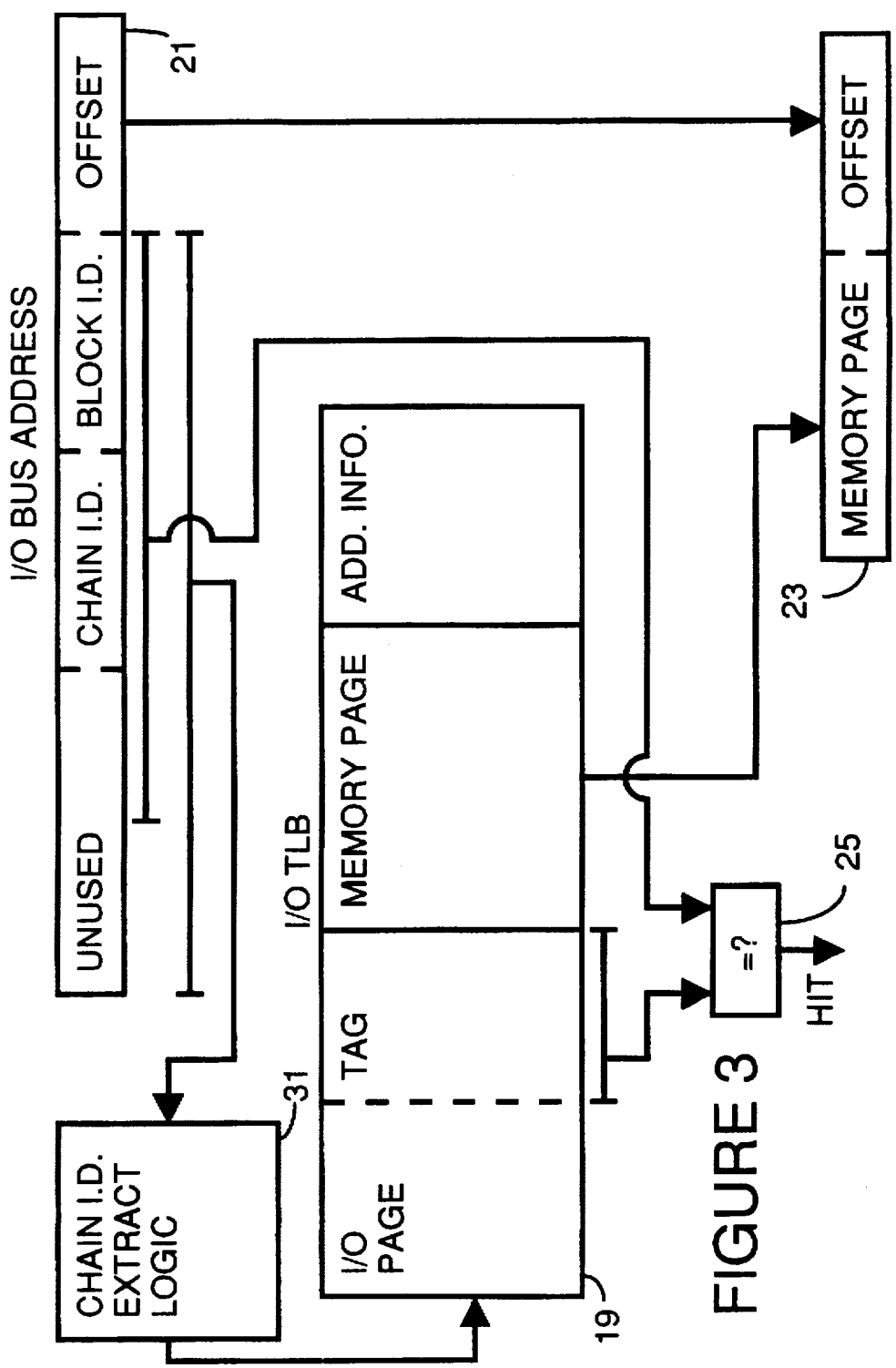
FIG. 3 shows an implementation of a I/O TLB within the I/O adapter shown in FIG. 1, in accordance with an alternate preferred embodiment of the present invention.

FIG. 3 shows an alternate implementation of I/O TLB 19 in accordance with an alternate preferred embodiment of the present invention. In this preferred embodiment, the page address portion of I/O bus address 21 also consists of a chain identification portion and a block identification portion. The size of the chain identification portion is determined by the number of entries available in I/O TLB 19. That is, the chain identification portion needs to contain just enough bits to allow each entry in I/O TLB 19 to be individually addressed by the chain identification portion. The size of the block identification portion is configurable at start-up time. The size of the block identification portion is determined by the number of entries available in I/O PDIR 20. That is, the block identification portion needs to contain just enough bits to allow each entry in I/O PDIR 20 to be individually addressed by the concatenation of chain identification portion with the block identification portion of an PO bus address.

When the block identification portion of the I/O bus address is less than the maximum size, a portion of a register into which the I/O bus address is placed will be unused. In the preferred embodiment, the value zero is stored in all bits of the register unused by the I/O bus address.

During a translation, the chain identification portion of I/O bus address 21 is used as an index into I/O TLB 19. Chain identification extract logic 31 receives the entire page address portion of I/O bus address 21. The entire page address portion of I/O bus address 21 includes the chain identification, the block identification and any unused portion of I/O bus address 21. Chain identification extract logic 31 extracts the chain identification from the page address portion of I/O bus address 21 for use as an index into I/O TLB 19.

Comparator 25 compares the tag portion of PO bus address 21 with the tag portion from the translation entry accessed by the chain identification portion of I/O bus address 21 to determine whether the currently sought translation is within I/O TLB 19. The tag portion of I/O bus address 21 includes the entire page address portion of I/O bus address 21 less a number of the leftmost bits which corresponds to the size of the chain identification portion. The I/O address offset is the same as the memory address offset.

For example, in the alternate preferred embodiment, I/O bus 14 utilizes addresses with a maximum size of thirty-two bits. Each address has a twelve bit offset and an 1O page number which varies in size from eight to twenty bits. The chain identification is the leftmost eight bits of the I/O page number. The block identification is the rightmost bits of the I/O page number. The block identification varies in size from zero to twelve bits. When the I/O page number is less than 20 bits, a portion to the left of the I/O page number is unused. Memory bus 14 utilizes forty bit addresses, each address having a twenty-eight bit memory page number and a twelve bit offset. In this system, no hashing or linked lists are necessary. The tag portion of I/O bus address 21 is the twelve rightmost bits of the page address portion of I/O bus address 21.

Figure 4:
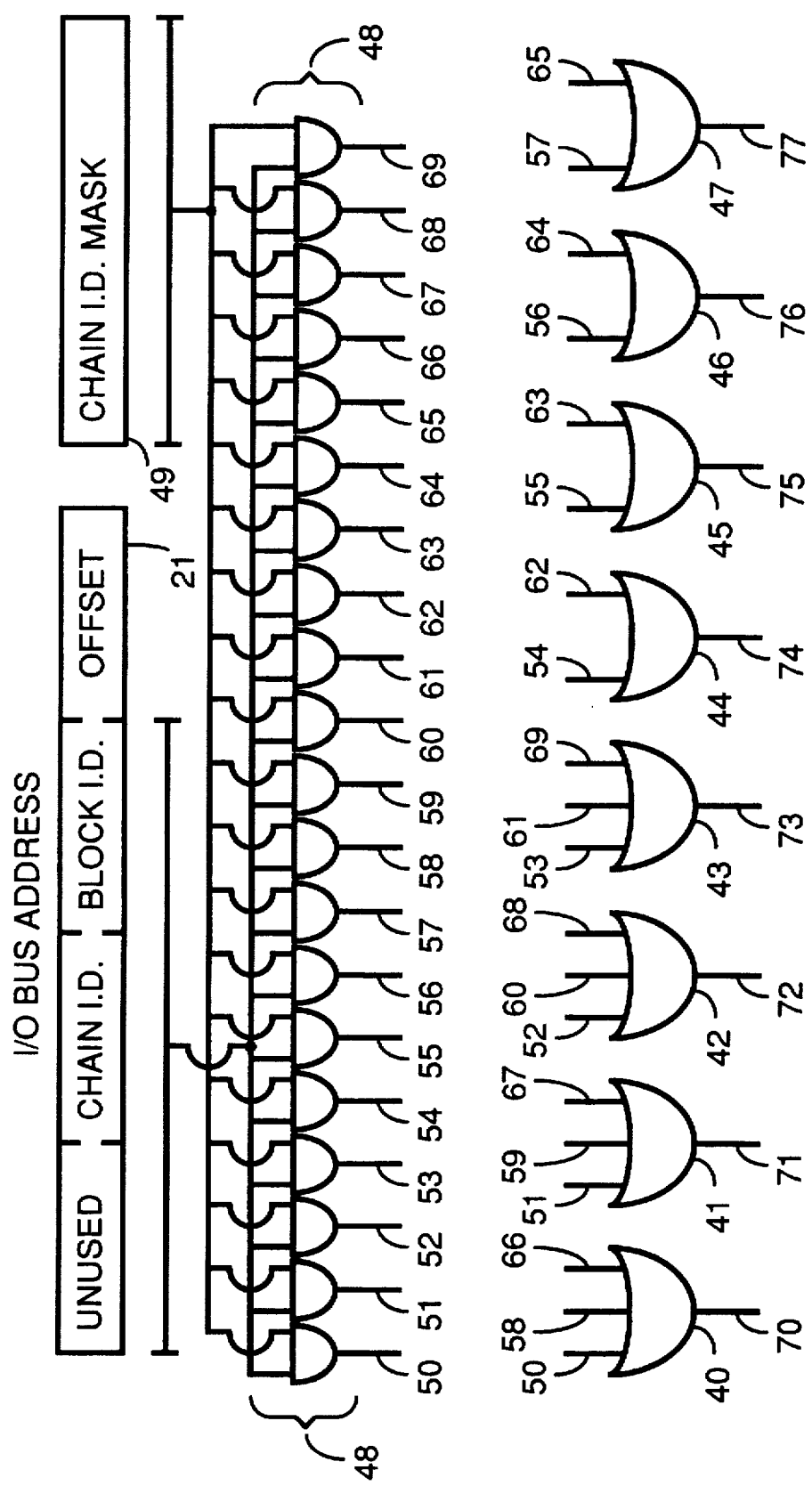
FIG. 4 shows chain identification extraction logic used when addressing the I/O TLB shown in FIG. 3 in accordance with the alternate preferred embodiment of the present invention.

FIG. 4 shows a block diagram of chain identification extraction logic used 31 shown in FIG. 3. At start-up time, the size of I/O bus addresses is configured by placing a value within a twenty bit chain identification mask register 49. Logic ones are placed in the eight bits within chain identification mask register 49 which conform to the relative location of the chain identification portion within I/O bus address. Logic zeros are loaded into the other locations within chain identification mask register 49.

Whenever there is an access to I/O TLB 19, logic AND gates 48 perform bit level logic AND between each bit of chain identification mask register 49 and each corresponding bit of the leftmost twenty bits of I/O bus address 21. The leftmost twenty bits of I/O bus address 21 includes each bit of the block identification portion, the chain identification portion and any unused portion.

Each of logic AND gates 48 receives a single bit from the chain I.D. mask 49 and a corresponding bit from I/O bus address 12 and performs a logic AND to generate a single output bit. A logic AND is performed on a high order bit of the chain I.D. mask 49 and a corresponding high order bit from I/O bus address 12 to produce a bit output 50. A logic AND is performed on a next-to-high order bit of the chain I.D. mask 49 and a corresponding next-to-high order bit from I/O bus address 12 to produce a bit output 51. Logic AND gates 48 likewise produce a bit output 52, a bit output 53, a bit output 54, a bit output 55, a bit output 56, a bit output 57, a bit output 58, a bit output 59, a bit output 60, a bit output 61, a bit output 62, a bit output 63, a bit output 64, a bit output 65, a bit output 66, a bit output 67, a bit output 68 and a bit output 69. Bit outputs 50 through 69 serve as inputs to a logic OR gate 40, a logic OR gate 41, a logic OR gate 42, a logic OR gate 43, a logic OR gate 44, a logic OR gate 45, a logic OR gate 46 and a logic OR gate 47, as shown. Logic OR gates 40 through 47 produce the eight bit chain identification on an output 70, an output 71, an output 72, an output 73, an output 74, an output 75, an output 76 and an output 77, as shown. The chain identification portion produced on outputs 70 through 77 will be rotated, dependent upon the position of chain identification portion within I/O bus address 21. However, in the preferred embodiment of the present invention this rotation has no effect on performance.

Figure 5:
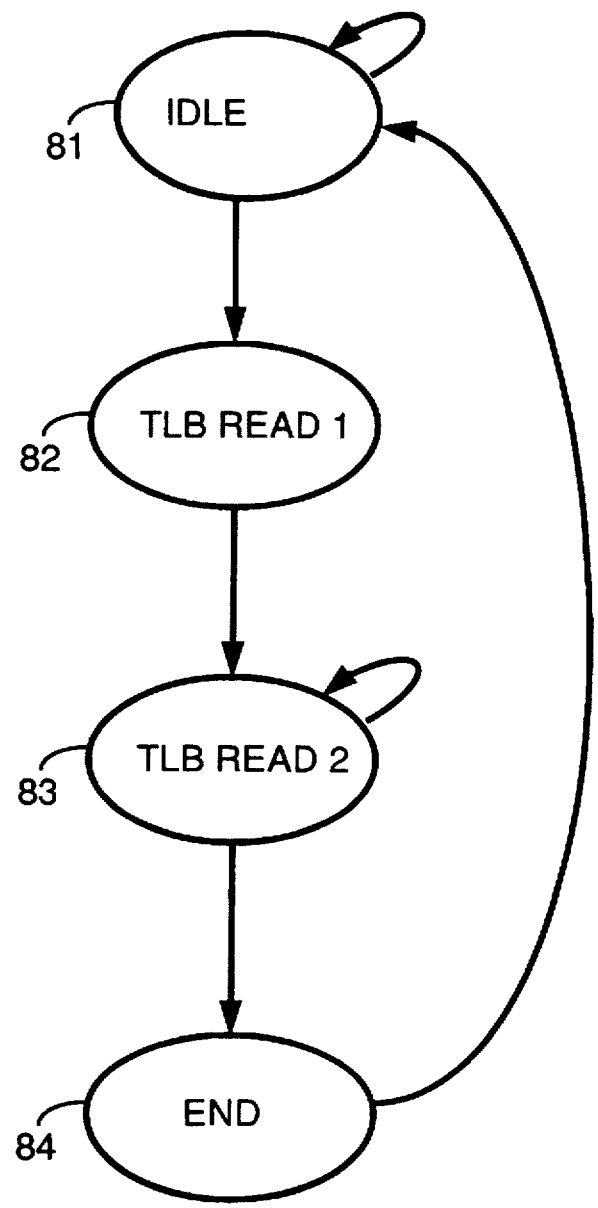
FIG. 5 shows a partial state diagram for the I/O adapter shown in FIG. 1 in accordance with the preferred embodiment of the present invention.

FIG. 5 shows a partial state diagram for I/O state machine 18 within I/O adapter 13. The portion of the state diagram shown handles messages inbound from I/O bus 14 when there is a TLB miss. For other transactions, such as an I/O transaction where there is a TLB hit, I/O state machine 18 enters into various states which are not shown. State machine 18 remains in an idle state 81 while no transaction occurs. When there is an I/O transaction and a TLB miss, state machine 18 enters into a first TLB read state 82. When state machine 18 is in first TLB read state 82, I/O adapter 13 issues a read of PDIR 20 in memory 12 through memory bus 9 to obtain the entry missing from translation map TLB 19. Then state machine 18 enters a second TLB read state 83. In second TLB read state 83, I/O adapter 13 waits for the entry to be returned from PDIR 20. In the preferred embodiment, while in second TLB read state 83, I/O adapter continually writes data into translation map TLB 19 at the location where the entry from PDIR 20 is to be written. The final write will leave the correct data in translation map TLB 19.

When the new entry arrives, state machine 18 enters an end state 84. After the update of translation map TLB 19 is complete, state machine 18 returns to idle state 81.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system, comprising:
   a memory bus for providing information transfer;
   an input/output bus for providing information transfer;
   a main memory, coupled to the memory bus, the main memory storing a page directory, the page directory storing translations from addresses used for data transfers over the input/output bus to addresses used to directly access the main memory, each translation indexed by a portion of an address for data transferred over the input/output bus and each translation including a portion of an address for a memory location within the main memory; and, an input/output adapter, coupled to the memory bus and the input/output bus, the input/output adapter including:
   input/output translation look-aside buffer, the input/output translation look-aside buffer including a portion of the translations stored in the page directory,
   an index extraction means for extracting an index from addresses of data transferred over the input/output bus, the index being used to access translations from the input/output translation look-aside buffer, the index extraction means including,
   configuration means for specifying a location of the index within the addresses, the location being variable via the configuration means, and
   checking means, coupled to the input/output translation look-aside buffer, for checking whether the translations accessed from the input/output translation look-aside buffer correspond to the addresses of data transferred over the input/output bus.

2. A computing system as in claim 1 wherein the configuration means comprises a mask register, into which a value is placed which identifies a relative position of the index within the addresses of data transferred over the input/output bus.

3. A computing system as in claim 2 wherein the index extraction means additionally includes:
   a first plurality of logic gates coupled to the mask register, for extracting the index from the addresses of data transferred over the input/output bus based on the value in the mask register.

4. A computing system as in claim 3, wherein the input/output adapter additionally includes:
   a hardware state machine which manages misses to the input/output translation look-aside buffer.

5. A computing system as in claim 1 wherein regardless of location within the addresses, the index does not vary in bit length.

6. A computing system as in claim 5 wherein the bit length of the index is eight bits.

7. In a computing system having a memory bus for providing information transfer and an input/output bus for providing information transfer, a method comprising the steps of:
   (a) storing, within a page directory in a main memory coupled to the memory bus, translations from addresses used for data transfers over the input/output bus to addresses used to directly access the main memory, each translation being indexed by a portion of an address for data transferred over the input/output bus and each translation including a portion of an address for a memory location within the main memory;
   (b) storing, within an input/output translation look-aside buffer, a portion of the translations stored in the page directory, the input/output translation look-aside buffer being within an input/output adapter which is coupled to the memory bus and the input/output bus;
   (c) extracting an index from addresses of data transferred over the input/output bus, including the following substep:
   (c.1) determining a location of the index from a value within a configuration register;
   (d) accessing translations from the input/output translation look-aside buffer using the index extracted in step (d); and,
   (e) checking whether the translations accessed from the input/output translation look-aside buffer correspond to the addresses of data transferred over the input/output bus.

8. A method as in claim 7 wherein in substep (c.1), the configuration register is a mask register, and the value identifies a relative position of the index within the addresses of data transferred over the input/output bus.

9. A computing system as in claim 8 wherein step (c) additionally includes the following substep:

(c.2) using a first plurality of logic gates, connected to the mask register, for extracting the index from the addresses of data transferred over the input/output bus based on the value in the mask register.

10. A method as in claim 7 additionally comprising the step of:

(f) when a first translation accessed from the input/output translation look-aside buffer does not contain an entry for a first address from which the index is extracted, accessing a translation for the first address from the page directory.

11. A method as in claim 10 wherein in step (f) the accessing of the translation for the first address from the page directory is managed by a hardware state machine within the input/output translation look-aside buffer.

* * * * *